July 22, 1958

W. J. O'BRIEN ET AL 2,844,816

RADIO NAVIGATION SYSTEMS

Filed March 7, 1955

| | TIME → | | |
|---|---|---|---|
| MASTER A | 9 | 12 | 10 | — |
| SLAVE B | 10 | — | 9 | 12 |
| SLAVE C | 12 | 10 | — | 9 |

INVENTORS
WILLIAM J. O'BRIEN
HAROLD G. HAWKER

By Walter Huntley
ATTORNEY

July 22, 1958   W. J. O'BRIEN ET AL   2,844,816
RADIO NAVIGATION SYSTEMS
Filed March 7, 1955   4 Sheets-Sheet 2

INVENTORS
WILLIAM J. O'BRIEN
HAROLD G. HAWKER
By Walter F. Huntley
ATTORNEY

United States Patent Office 2,844,816
Patented July 22, 1958

2,844,816
RADIO NAVIGATION SYSTEMS

William Joseph O'Brien and Harold George Hawker, London, England, assignors to The Decca Record Company Limited, London, England, a British company Application March 7, 1955, Serial No. 492,592

Claims priority, application Great Britain March 8, 1954

18 Claims. (Cl. 343—105)

This invention relates to hyperbolic radio navigation systems in which, at a mobile receiver, a phase comparison is made between signals received from spaced transmitting stations.

In hyperbolic radio navigation systems, a position line may be obtained by determining the difference in propagation time of signals emitted from two spaced stations. The present invention relates more particularly to hyperbolic radio navigation systems in which signals are transmitted alternately or in sequence from the stations, the radiated signals being synchronised continuous wave signals of harmonically related frequencies.

According to this invention, in a hyperbolic radio navigation system in which the position line is determined by indicating the difference in the time of propagation to a receiver of signals emitted from two stations in known spaced geographical position, three signals are emitted from a first station satisfying the respective phase conditions, given in radians of angle, $n_1\omega_0 t + a_1$, $n_2\omega_0 t + a_2$ and $(n_1+1)\omega_0 t + a_3$, and three signals are emitted from the second station satisfying the respective phase conditions $n_1\omega_0 t + a_1 + k$, $n_2\omega_0 t + a_2 + k$ and $(n_1+1)\omega_0 t + a_3 + k$, where $n_1$ and $n_2$ are integers, $\omega_0$ is $2\pi$ multiplied by a fundamental frequency in cycles per second, $t$ is time in seconds and $a_1$, $a_2$, $a_3$ and $k$ are constants, the transmissions being switched in sequence such that the signals of each frequency are transmitted from one station during intervals of the transmissions of the same frequency from the other station, and the transmission being distinctively altered periodically for synchronising switching means at the receiver with the switching of the transmissions and wherein the receiver comprises means for receiving the radiated signals, switching means which are synchronised by the distinctive alteration in transmission and which are arranged to separate the received signals from the two transmitters, and a phase difference indicator for indicating the difference in time of propagation which indicator has a recurrence cycle of time difference indication equal, in seconds, to the reciprocal of the fundamental frequency, said indicator being operated by a fine control and a coarse control, said fine control being dependent on a pair of signals derived from locally generated non-interrupted signals, one of which is phase-controlled by only one of the signals received from said first station and the other by only one of the signals received from said second station and the coarse control being dependent on six received signals derived from the three different frequencies transmitted from each of the stations. This arrangement permits of the fullest amount of information to be obtained from the limited number of different transmitted frequencies, thus enabling this information to be utilised to reduce to a minimum both the inherent ambiguities in time or phase indication and also the ambiguity resulting from phase shifts due to reception of signals reflected from the ionosphere.

In addition to providing a fine control and a coarse control, it would be possible also to provide one or more intermediate controls. Such an intermediate control may be effected using only the three frequencies from each station or one or more additional frequencies may be radiated for this purpose. A system having such an intermediate control may be regarded as a combination of two navigation systems having different fundamental frequencies of which one is an integral multiple of the other so that some of the transmissions are common to both systems. For simplicity, therefore, except where stated otherwise it will be assumed in the following description that only a fine and a coarse control are provided.

Furthermore, in some systems with only fine and coarse control, more than three frequencies may be radiated advantageously from each station but, except where otherwise stated, it will be assumed that a single arrangement employing only three frequencies is employed.

In one arrangement of the invention, the two locally generated non-interrupted signals may be produced in the receiver by a pair of oscillators arranged to oscillate at the same frequency, which frequency is one of the radiated frequencies, the two oscillators being controlled in phase respectively by the phase received from the two stations. Sometimes, however, it may be preferable that at least one of the two locally generated non-interrupted signals is produced in the receiver by an oscillator arranged to oscillate at said fundamental frequency. These oscillations at the fundamental frequency may readily be converted to signals of any of the multiples of the fundamental by a harmonic generator, such as, for example, a pipper such as that shown and described in the W. J. O'Brien Patent No. 2,524,677, issued October 3, 1950, which produces pulse signals of extremely short duration at a fixed pulse recurrence frequency. Such signals are characterized by many strong harmonics in fixed phase relationship. This oscillator may thus conveniently serve also as a reference signal generator.

At each station the various different frequencies may be radiated simultaneously. The signals must be radiated intermittently from the two stations so that they may be separately received at the receiver. Such intermittent radiation of a plurality of different frequencies at each of the two stations may conveniently occur during intervals in a normal transmission in which signals of different frequencies are radiated simultaneously from the two stations. This intermittent radiation may be arranged, for example, to serve as lane identification transmissions in a system such as is described in British patent specification No. 656,108 in which transmissions providing normal position fixing are periodically interrupted to enable signals providing a coarser position fixing to be transmitted. As described in that specification, during the normal transmissions a single signal may be radiated from each station and conveniently the frequency of each of the single signals is one of the aforementioned frequencies $n_1$, $n_2$ or $n_1+1$ multiplied by the fundamental frequency. At the receiver the simultaneously received signals of different frequency from the first station may be combined to produce a signal of the fundamental frequency, which signal of the fundamental frequency is used to phase-lock a frequency divider coupled to divide, to the fundamental frequency, that one of the locally generated non-interrupted signals which is phase controlled by the first station thereby providing a first output of said fundamental frequency and the simultaneously received signals of different frequency from the second station may be combined to produce a signal of the fundamental frequency, which signal of the fundamental frequency is used to phase-lock a second frequency divider coupled to divide, to the fundamental frequency, the second of the locally generated non-interrupted signals which are phase controlled by the second station thereby providing a second output of said fundamental frequency.

In this arrangement, the aforesaid coarse control may be effected by phase comparison of the two output signals of the fundamental frequency.

Instead of radiating the various different signals simultaneously from each station, the various different frequencies may be radiated in sequence from each station. This is particularly advantageous at very low frequencies below, say, about 20 kc./s. since at such frequencies the cost of multiple tuning of an antenna is very great.

In one arrangement in which the various different frequencies are radiated in sequence from each station and in which the two locally generated non-interrupted signals are produced in the receiver by a pair of oscillators arranged to oscillate at the same frequency, which frequency is one of the radiated frequencies, the two oscillators being controlled in phase respectively by the signals received from the two stations, there may be provided at the receiver a pair of dividers associated respectively with the two oscillators each divider being arranged to divide the oscillator output frequency to a frequency equal to the difference between $n_1$ and $n_2$ multiplied by the fundamental frequency. Each of the dividers may then be phase locked by a beat signal obtained by combining two signals, one of which is the output of the associated oscillators and the other of which is that one of the three signals received from the transmitter controlling the associated oscillator which differs in frequency from the oscillator frequency by an amount equal to the frequency of the divider output. The two divider outputs might be compared in phase to provide a relatively coarse pattern. However, to make the fullest use of the radiated signals it is preferable that the oscillators at the receivers should be controlled by the received signals of $n_1$ or $n_1+1$ multiplied by the fundamental frequency and that there should be provided a further pair of frequency dividers arranged respectively to divide the outputs of the first pair of dividers to the fundamental frequency. Each of the second pair of dividers may then be phase locked by a beat signal obtained by combining two signals, one of which is the output of the associated oscillator and the other of which is that one of the three signals received from the transmitter controlling the associated oscillator which differs in frequency from the oscillator frequency by an amount equal to the fundamental frequency, the two outputs from the further pair of dividers being used to effect the coarse control of the phase difference indicator. By this arrangement a phase comparison may be made which is effectively a phase comparison of signals of the fundamental frequency from the two transmitters.

Although in the arrangements described above only two stations have been considered which will provide a single position line, as is well known in the art of hyperbolic radio navigation, two position lines and hence a position fix may be obtained by providing either two pairs of stations or by providing a third (and possibly one or more further transmitting stations), all the stations in the latter case being synchronised in phase. Thus there may be provided, in the system of the present invention, a third transmitting station radiating signals satisfying the respective phase conditions, given in radians of angle $$n_1\omega_0 t + a_1 + k_1, \ n_2\omega_0 t + a_2 + k_1 \text{ and } (n_1+1)\omega_0 t + a_3 + k_1$$

where $k_1$ is a constant, the transmissions being switched in sequence such that the signals of each frequency are transmitted from one station during intervals of the transmissions of the same frequency from the other stations. With this transmitting arrangement it is possible to obtain two position line indications, that is to say to obtain a position fix and for this purpose the receiver may be provided with two phase difference indicators each operated by a fine control and a coarse control, as previously set forth, one indicator being arranged to indicate the difference in time of propagation of signals from the first and second stations and the other being arranged to indicate the difference in time and propagation of the signals from the third station.

The following is a description of a number of embodiments of the invention reference being made to the accompanying drawings in which.

Figure 1:
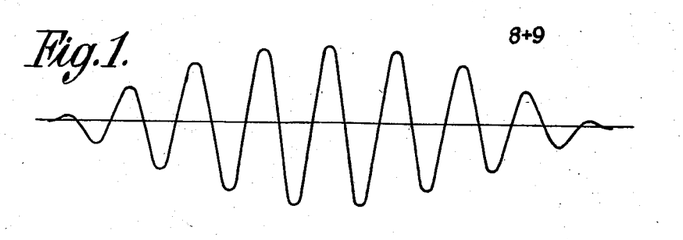
Figures 1, 2 and 3 are diagrams illustrating wave forms obtained by combining signals of harmonically related frequencies.
Figure 2:
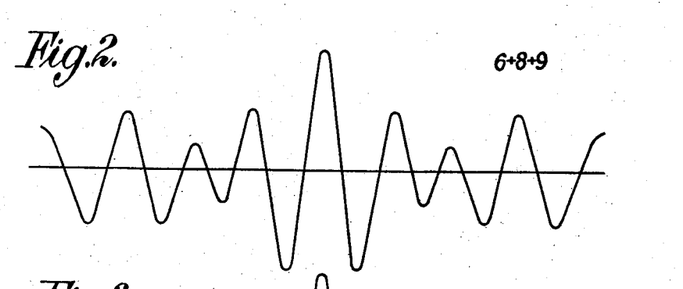
Figure 3:
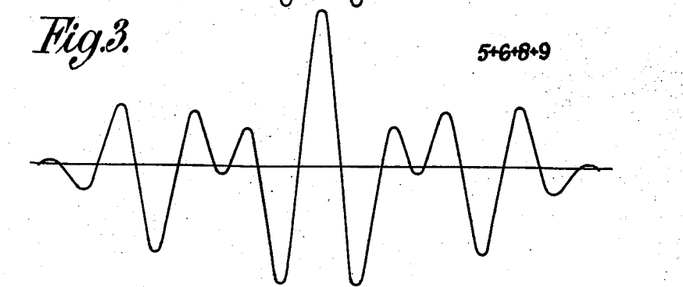

The present invention makes use of the information that can be obtained from combining a number of continuous wave signals of harmonically related frequencies which are in a fixed phase relationship. Figure 1 illustrates the combination of two waves which are the eighth and ninth harmonics of a fundamental frequency, the drawing showing a time period equal to a half cycle of the fundamental frequency as is apparent from inspection of the envelope of the wave shown. From this envelope it is possible to determine the phase of the fundamental frequency. Increasing the number of signals combined in this manner gives a marked improvement in the definition of the phase of the fundamental. Thus in Figure 2 there is shown a combination of the sixth, eighth and ninth harmonics and in Figure 3 there is shown the combination of the fifth, sixth, eighth and ninth harmonics. In Figures 2 and 3 there is a marked and clearly defined peak which can be used in particular to define the phase of the fundamental frequency. The present invention makes use of this further information regarding the phase of the fundamental frequency which can be obtained from the use of three or more harmonically related continuous wave signals.

Figure 4:
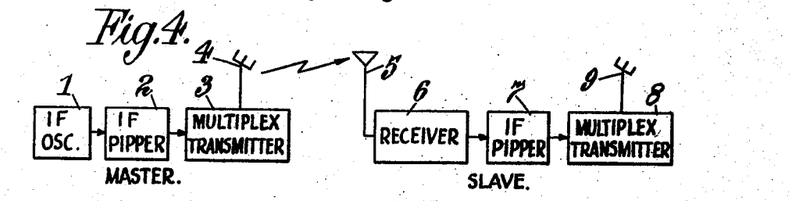
Figure 4 is a block diagram illustrating a transmitting system.

Figure 4 is a block diagram of a master and a slave transmitter for a hyperbolic radio navigation system. At the master station an oscillator 1 of frequency 1$f$ feeds a pulse forming circuit 2 which produces short duration pips at a repetition rate of 1$f$. These pips are fed into a multiplex transmitter 3 which energises the transmitting antenna 4 with signals of the required harmonics of 1$f$. At the slave station, these signals are received by antenna 5 coupled to a receiver 6, which latter serves to control the phase of pips having a 1$f$ repetition rate generated by a circuit 7. These pips from the circuit 7 are fed, in a similar manner to that employed at the master station, to a multiplex transmitter 8 which in turn energises the transmitter 9 with the required harmonic signals.

Figure 5:
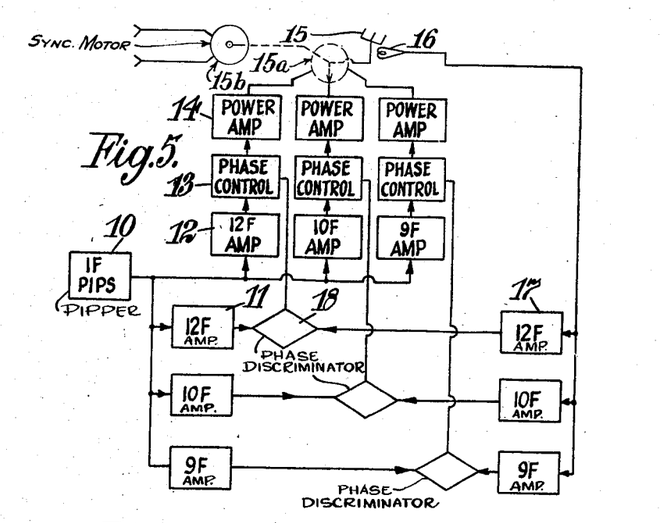
Figure 5 is a block diagram illustrating a multiplex transmitter as used in the system of Figure 4.

The multiplex transmitter used in the master and slave stations is shown in further detail in Figure 5. The pips of frequency 1$f$ from the input 10 are fed into the inputs of two amplifiers 11 and 12 tuned to the frequency 12$f$. The output from amplifier 12 is passed through a combined manual and electronic phase control circuit 13 to a power amplifier 14, the output of which energises the transmitting antenna 15 through a four-position rotary switch 15$a$ connected as shown between the power amplifiers and the antenna 15. A signal from the antenna 15 is picked up at 16 and is fed into an amplifier 17 tuned to the frequency 12$f$ which in turn feeds the amplified signal to one input of a phase discriminator 18. The output from the amplifier 11 is applied to the second input of the phase discriminator 18 which serves to compare the phase of these two signals of frequency 12$f$ and to produce a direct voltage output which is applied to the electronic phase control circuit 13. The phase shifts through the amplifiers 11 and 17 are adjusted to give zero discriminator output voltage when the inputs to the amplifiers are coupled to a common source. By this arrangement the output phase of the radiated signal as seen at the input of the amplifier 14 is maintained in phase with the pips of 1f frequency from the circuit 10 which is the input to the amplifier 11. The circuit just described thus serves to maintain the phase relationship of the radiated signals of frequency 12f. This circuitry can be duplicated for any number of harmonics and there are shown in Figure 5 similar circuits for controlling also the phase of radiated signals of frequency 10f and 9f. The radiation of any of these harmonics may be switched on or off at will provided the antenna is multi-tuned. If the antenna is not multi-tuned, then only one signal may be radiated at a time and the antenna tuning must be switched to resonate with the applied signal.

Triple tuned transmitting antennae with phase control of the type described are in commercial use and a more detailed description of this form of phase control of harmonically related radiated signals is given in the specifications of British Patent Nos. 656,108 and 656,126. However, at very low frequencies, such as for example below 20 kc./s., the cost of multiple tuning of a transmitting antenna becomes almost prohibitive if high power radiation is to be obtained. At such very low frequencies, therefore, it may be desirable to limit the radiation from each station to one signal at a time and this can be achieved by switching the signals so that they are radiated in sequence at each station.

Figure 6:
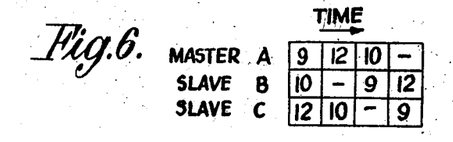
Figure 6 is a table showing time schedules of transmissions.

Figure 6 is a table showing the allocation of time periods suitable for a very low frequency system employing three stations each radiating on three frequencies and arranged so that each station only radiates one frequency at a time. It will, of course, be appreciated that different stations may radiate different frequencies at the same time. In the time schedule a blank period is shown and this period may be used for synchronising the switching at the transmitting stations and at the receivers. The switching rate may be very slow and might, for example, be controlled by means of a synchronous motor 15b such as is used for a synchronous electric clock. However, many methods of synchronising switching at the receiver utilising an alteration (such as the interruption provided by the blank period) of the transmissions from one station are known in the art.

Figure 7:
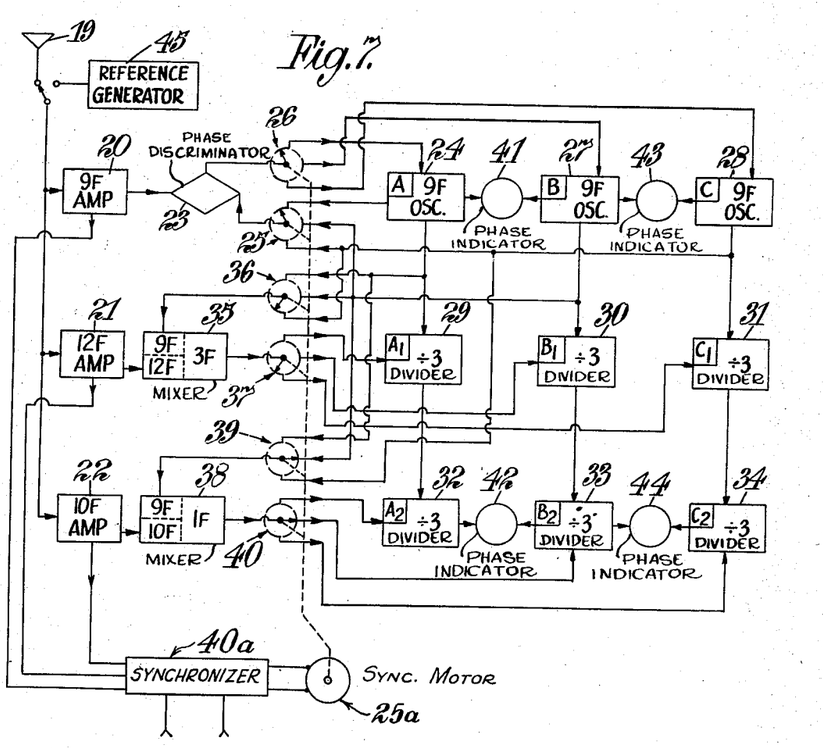
Figures 7, 8 and 9 are block diagrams of three forms of receiving apparatus.

A receiver for use with a transmitting system operating on the schedule given in Figure 6 is shown in Figure 7. The antenna 19 picks up all the received signals and feeds them to the inputs of three amplifiers 20, 21, 22 which are tuned respectively to the ninth, twelfth and tenth harmonics of a fundamental frequency f. The output of amplifier 20 is applied to one input of a phase discriminator 23. During the periods when the 9f signal is radiated from the station A, the other input of discriminator 23 is fed from an oscillator 24 of frequency 9f through the appropriate contact of switch 25 which is driven by synchronous motor 25a in synchronism with the switching of the transmissions. The discriminator 23 produces a direct voltage output dependent on the phase relationship of the two applied signals and this output is applied to oscillator 24 via switch 26 so as to adjust the oscillator in phase in a manner to maintain the phase of the oscillator in synchronism with the output of the amplifier 20. By this means the oscillator 24 produces a continuous signal, that is a non-interrupted signal, which is phase locked to the interrupted signal received from the amplifier 20. The oscillator 24 thus provides an output which is equivalent to that which would be obtained from the amplifier 20 if the signal of frequency 9f were continuously transmitted only from station A. A second and a third 9f oscillator 27 and 28 are phase locked in a like manner to the output of amplifier 20 during the times of transmission of the 9f signal from stations B and C respectively.

The outputs of frequency 9f from each of the oscillators 24, 27 and 28 are reduced to a frequency of 3f by the frequency dividers 29, 30 and 31 respectively. These signals of frequency 3f are again divided down to a frequency of 1f by the dividers 32, 33 and 34.

A mixer 35 derives a signal of frequency 3f from the beat note resulting from mixing the 12f output of amplifier 21 with the 9f signal from the oscillator 28 via switch 36 during the period when the 12f input of amplifier 21 is received from C station. This 3f output from the mixer 35 is applied to the C station divider 31 via the switch 37. By this means the divider 31 is properly "notched," that is, it is under control by a particular one of each group of three cycles of the 9f input. The dividers 29 and 30 are "notched" in the same manner at the appropriate time periods, that is to say the second and fourth periods on the table in Figure 6 when the 12f signals are radiated from the A and B stations respectively.

In a similar manner a mixer 38 produces a 1f output from the beat note resulting from mixing the 10f output of amplifier 22 with the 9f output from the oscillator 27 via switch 39 during the period when the 10f input to the amplifier 22 is received from the B station. This 1f output from mixer 38 is applied to the B station divider 33 via the switch 40. By this arrangement the divider 33 is "notched," that is it is controlled by a particular one of each group of three pulses in the divider 30, which means it is under control by a particular one cycle of each group of nine cycles from the oscillator 27. The dividers 32 and 34 are "notched" in a similar manner at the appropriate time periods, that is to say the third and second periods respectively of the schedule shown in Figure 6. A synchronizer 40a may be connected to control the motor 25a, the synchronizer 40a being connected to the outputs of amplifiers 20, 21, and 22 and arranged to respond to the cessation of the 10f signal at a time when all three frequencies are simultaneously received (this corresponds to the end of the first period of Fig. 6). Such coincidence detectors are well known.

It will be seen that the arrangement thus far described provides continuous 9f signals at the receiver corresponding to the interrupted 9f signals from each of the three stations, the continuous signals being phase locked to the received interrupted signals. There is also provided a 1f signal for each station which is the equivalent of a 1f signal transmitted in the form of a 9f signal in which an individual cycle is identifiable in each group of nine cycles.

A phase difference indicator 41 provides a fine indication of the difference in time of propagation from the A and B stations to the receiver. The indicator 41 is fed from the outputs of oscillators 24 and 27. Another phase difference indicator 42 is coupled to the 1f outputs of the dividers 32 and 33 to provide a coarse indication which eliminates or reduces the ambiguities of the indicator 41 and so extends the range of indication of the indicator 41. It will be noted that these two indicators 41 and 42 together indicate one position line in the pattern of hyperbolic lines provided by the A and B stations. A similar fine indicator 43 and coarse indicator 44 are provided for the A and C pair of stations to indicate a second position line.

In common with all other phase comparison radio navigation system receivers, the receiver of Figure 7 must be referenced, that is the relevant phase differences in the various stages in the receiver must be adjusted to known values. A generator 45 of pips having a recurrence frequency of 1f is provided for this purpose, the pips providing a series of harmonics of the fundamental in fixed phase relation to form a phase standard for referencing.

In a transmitting system for use with the receiver of Figure 7, the receivers at the slave stations, that is the receiver 6 in Figure 4, may be made similar to part of the receiver just described with reference to Figure 7. The 1f pips of the circuit 7 in Figure 4 would be supplied by the part of the receiver corresponding to the divider 32 of Figure 7. In using the receiver of Figure 7 as the receiver for a slave station, the oscillators 27 and 28 and their associated dividers 30, 31, 33 and 34 would not be required.

Figure 8:
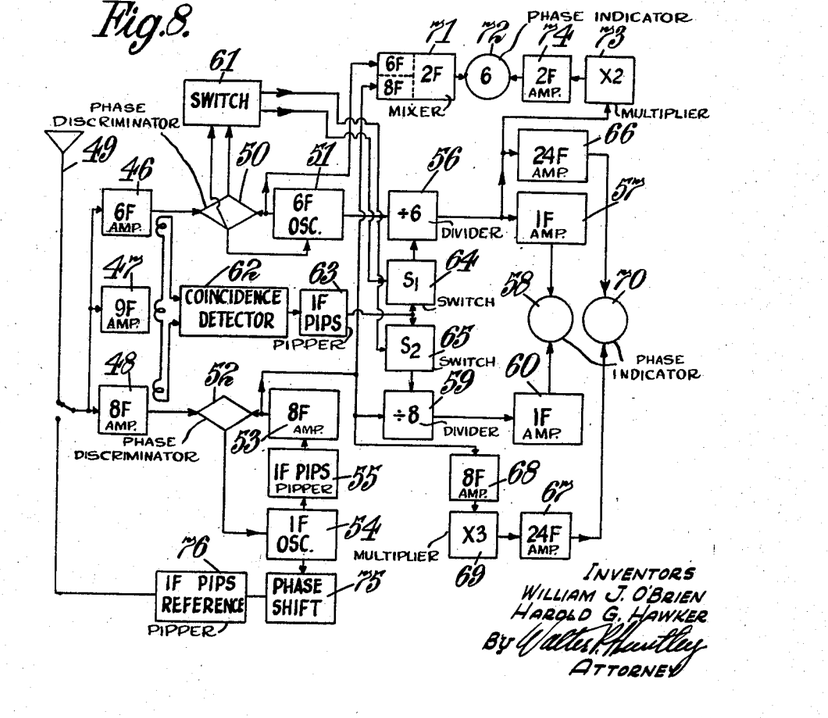

For any given sequence of transmissions, there are many ways of constructing a receiver to give identical or equivalent information. A number of different circuit arrangements for giving phase difference indications are shown in Figure 8 which is a block diagram of another form of receiver. The receiver of Figure 8 for simplicity is shown only as a receiver for indicating a single line of position. The receiver is assumed to be operating with a transmitting system employing frequencies of $6f$, $8f$ and $9f$. The transmitting system will be assumed to operate on a cycle in which there is a first period (e. g. 30 seconds) during which a signal of $6f$ is transmitted from a station A and signal of $8f$ is transmitted from a station B. For a short interval (e. g. half a second) these transmissions are interrupted and signals of $6f$, $8f$ and $9f$ are radiated from station A and no signals from station B. The normal transmissions are then resumed with $6f$ from A and $8f$ from B for a further period (e. g. 30 seconds) and these transmissions are again interrupted for a short period (e. g. half a second) during which no signals are radiated from A and signals of $6f$, $8f$ and $9f$ are radiated from B. The normal transmissions of $6f$ from A and $8f$ from B are then resumed following the cycle just described.

Referring to Figure 8, there are provided amplifiers 46, 47 and 48 for amplifying respectively the signals of frequencies $6f$, $9f$ and $8f$ which are picked up by a receiving antenna 49. The output of the amplifier 46 is applied to one input of a phase discriminator 50 and the second input of this phase discriminator is fed from an oscillator 51. The direct voltage output of the discriminator 50, which output depends on the phase relationship between the two $6f$ input signals, is applied to the oscillator 51 to control the frequency of the oscillator so as to maintain a zero voltage output. Thus the two inputs from the discriminator 50 are locked in phase. During the transmission periods during which the normal $6f$ transmission from station A is interrupted, the output of the discriminator 50 is prevented from controlling the oscillator 51 by a switching device 61 described hereinafter, which is operated in synchronism with the switching of the transmissions.

In a similar manner the output of the $8f$ amplifier 48 is applied to one input of a discriminator 52 and the second input of the discriminator is fed from the output of an amplifier 53 tuned to a frequency of $8f$. This amplifier 53 is fed with a signal of frequency $8f$ derived from a $1f$ oscillator 54 through a $1f$ pulse forming circuit 55 which produces a series of harmonics in fixed phase relationship with the $1f$ output of the oscillator 54. In some systems, the frequency $1f$ may be too low for convenient use of a crystal oscillator and in that case the oscillator 54 may be in the form of a beat oscillator using a pair of crystals. The output voltage from the discriminator 52 controls the oscillator 54 so as to ensure that the two inputs to the discriminator are locked in phase. During the periods in which the $8f$ transmission from the station B is interrupted, the output of the discriminator 52 is prevented from controlling the oscillator 54 by the aforementioned switching device 61.

The circuit thus far described has two continuously operating oscillators 51 and 54 which provide signals of frequencies $6f$ and $8f$ phase locked to the non-continuous received signals of these frequencies. These continuous signals from the oscillators are particularly suitable for operating divider circuits as they are free from interference and from rapid phase shifts which might cause notch jumping of the dividers.

The $6f$ signal from oscillator 51 is applied to the input of a divider 56 which divides the frequency by six to give a $1f$ output. This output is applied to an amplifier 57 which in turn feeds one input of the phase difference indicator 58. In a similar manner the $8f$ signal from the amplifier 53 is divided by the frequency divider 59 to produce a $1f$ output which is fed to the amplifier 60 where it is amplified before being applied to the other input of the indicator 58.

The aforementioned discriminator 50 associated with the $6f$ signal from station A is of the double output type, that is to say it provides a first direct voltage output which is proportional to the sine of the phase difference of the applied input signals and a second direct voltage output which is proportional to the cosine of the phase difference. When the sine output is used to control the oscillator 51, that output is maintained at zero. The cosine output, therefore, is at its maximum positive or negative value. These two voltage outputs from the discriminator 50 can be utilised for synchronising the switching at the receiver with that at the transmitter. For this purpose the switching at the transmitters is synchronised in time with very short duration alterations in phase of the radiation of the $6f$ signals from station A. When the radiation of frequency $6f$ is altered in phase, resultant direct voltages are produced during these signalling periods by the discriminator 50 at the receiver and are applied to a signalling and switching circuit 61 which controls the timing of the switching at the receiver. The duration of the phase-changed signalling transmissions is made so short that it does not affect the indicators at the receiver.

The outputs from the amplifiers 46, 47 and 48 are combined and fed into a coincidence detector 62. The phase changes through the amplifiers 47 and 48 are adjusted so that, when the three amplifiers are fed with reference signals in known phase relationship, the input to the coincidence detector has the waveform shown in Figure 2. The coincidence detector (a circuit which indicates the time at which the positive-going peaks of several combined signals are coincident) delivers pips at a frequency of $1f$ to a pip amplifier 63 which in turn "notches" the dividers 56 and 59 at the appropriate time as controlled by switches 64 and 65.

A fine pattern of phase difference indication is obtained by comparing two signals at a frequency $24f$. One of the $24f$ signals is obtained from a $24f$ amplifier 66 which amplifies the twenty-fourth harmonic derived from the $1f$ pulse output of divider 56. The other $24f$ signal is obtained from an amplifier 67 which amplifies signals of frequency $24f$ derived from the oscillator 53, the output of the oscillator 53 for this purpose being amplified by an amplifier 68 and multiplied in frequency by a frequency multiplier 69. The phase difference between the outputs of the amplifiers 66 and 67 is indicated by a phase indicator 70.

An intermediate pattern of phase difference indication based on effective $8f$ transmissions from the two stations is obtained by mixing the $6f$ signal from oscillator 51 with the $8f$ signal from amplifier 53 in a mixer 71 to give a $2f$ output signal which is applied to one input of a phase difference indicator 72. The output of divider 56 is multiplied by two in a multiplier 73 whose $2f$ output is amplified by an amplifier 74 to provide a second input signal to the phase indicator 72.

A reference generator for standardising the receiver is provided by the oscillator 54, the output of which after passing through a phase shifter 75, is fed to a pip generator 76 which generates pips at a recurrence frequency of $1f$ thereby providing a series of harmonics of the fundamental frequency $f$ in fixed phase relationship.

Figure 9:
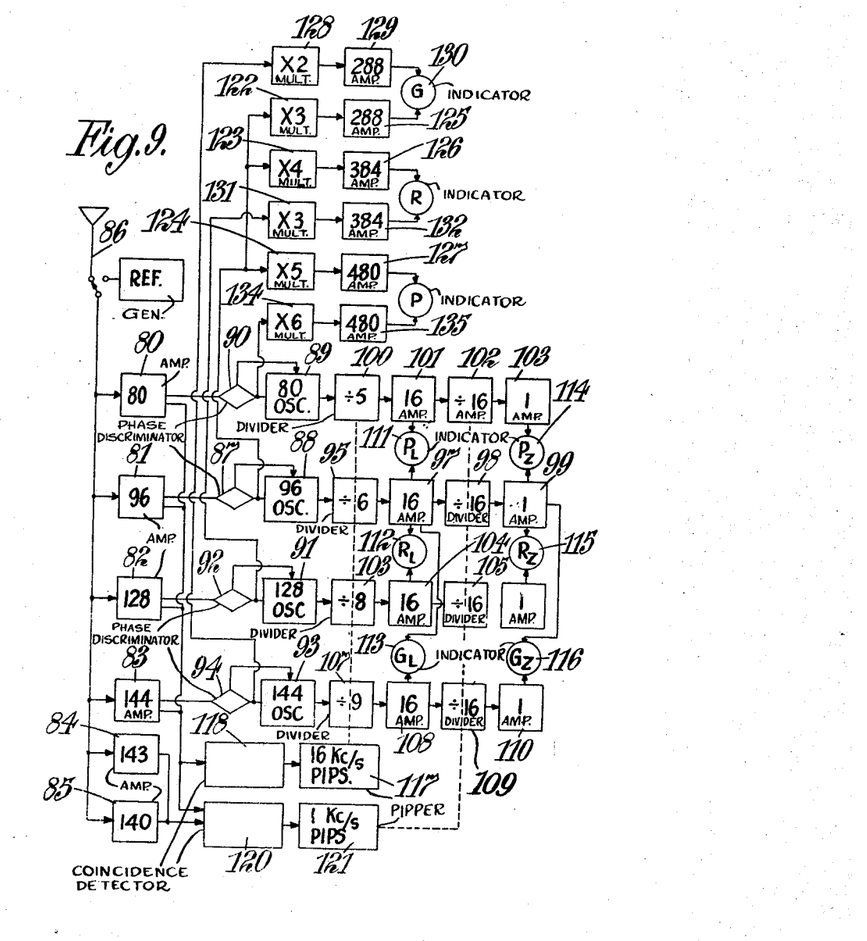

Yet another form of receiver making use of the information obtainable from the radiation of a plurality of signals from one station is shown in Figure 9. This receiver is for use in a four station navigation system having a central master station and three slave stations. These slave stations, for convenience, will be termed the G, R and P slaves. In this example, the normal master frequency is assumed to be 96 kc./s., the normal P slave frequency 80 kc./s., the normal R slave frequency 128 kc./s. and the normal G slave frequency 144 kc./s. It will be seen that these frequencies are the sixth, fifth, eighth and ninth harmonics of a 16 kc./s. fundamental frequency. During normal transmissions, a single frequency is radiated from each station and these signals are employed in the manner described in British patent specification No. 620,479, the non-ambiguous pattern frequencies being 288 kc./s. for the G and master pair, 384 kc./s. for the R and master pair and 480 kc./s. for the P and master pair. The receiver of Figure 9, as will be described later, is arranged also to produce non-ambiguous indications for each of these pairs with respect to pattern frequencies of both 16 kc./s. and 1 kc./s. For this purpose each of the transmitting stations in turn are arranged to radiate simultaneously frequencies of 80 kc./s., 96 kc./s., 128 kc./s., 144 kc./s., 143 kc./s. and 140 kc./s., the radiations of this group of signals from each station being for a period of half of a second in each minute. This switching of the transmissions is synchronised with some modification of the transmission for signalling purposes so that switching at the receiver may be synchronised with the switching of the transmissions. This switching synchronism may be effected in the same manner as has been described with reference to Figure 8 or in any other convenient manner. As previously mentioned, many methods for the control of switching at the receiver in synchronism with switching at the transmitter are known in the art.

Referring to Figure 9, there are shown six separate amplifiers 80-85 tuned respectively to frequencies of 80 kc./s., 96 kc./s., 128 kc./s., 144 kc./s., 143 kc./s. and 140 kc./s. The inputs to all these amplifiers are coupled to a common antenna 86 which receives all the radiated signals. The output of the amplifier 81 is applied to one input of a phase discriminator 87 and to the other input of this phase discriminator is fed the output of a 96 kc./s. oscillator 88. The direct voltage output of the discriminator is applied to the oscillator 88 so as to control the frequency thereof in such manner that the output of the oscillator 88 is locked in phase to the output of the amplifier 81 during the periods when the 96 kc./s. signal is radiated from the master station. In a similar manner an 80 kc./s. oscillator 89 is phase locked to the normal transmission from the P slave by means of a phase discriminator 90. A 128 kc./s. oscillator 91 is phase locked to the normal transmission from the R slave by means of a phase discriminator 92 and a 144 kc./s. oscillator 93 is phase locked to the normal transmission from the G slave by means of a discriminator 94.

The 96 kc./s. output of oscillator 88 is applied to a frequency divider 95 which divides the frequency by five to produce a 16 kc./s. output signal which is applied to an amplifier 97. The output of the amplifier 97 is applied to another frequency divider 98 which divides the frequency to produce a 1 kc./s. output signal which is fed to an amplifier 99. Similarly the output of the 80 kc./s. oscillator 89 is divided in frequency by five in a frequency divider 100 to give a 16 kc./s. signal which is amplified in an amplifier 101 and which is fed to a frequency divider 102 to produce a 1 kc./s. output applied to an amplifier 103. The 128 kc./s. output of oscillator 91 is divided by eight in the frequency divider 103 to produce a 16 kc./s. output which is amplified in an amplifier 104 and which is fed to a frequency divider 105 to produce a 1 kc./s. output applied to amplifier 106. Likewise the 144 kc./s. output of oscillator 93 is applied to a frequency divider 107 to produce a 16 kc./s. output which is amplified in an amplifier 108 and fed to a further frequency divider 109 which produces a 1 kc./s. signal which in turn is applied to an amplifier 110. The circuits associated with the amplifier 81 constitute a master station channel, those associated with amplifier 80 a P slave channel, those associated with amplifier 82 an R slave channel and those associated with amplifier 83 a G slave channel.

Phase indicators 111, 112 and 113 indicate the phase difference between the 16 kc./s. signal in the master channel and each of the three 16 kc./s. signals in the P slave, R slave and G slave channels respectively. Similarly phase indicators 114, 115 and 116 indicate respectively the phase difference between the 1 kc./s. signal in the master channel and each of the three 1 kc./s. signals in the three slave channels.

It will be appreciated that if the indicators 111–113 are to indicate unambiguously position lines with respect to 16 kc./s. patterns and if the indicators 114–116 are to indicate position lines unambiguously with respect to 1 kc./s. patterns, then the dividers in the master and slave channels must be properly "notched." The dividers 95, 103 and 107 which divide the frequency from the respective channels down to 16 kc./s. are "notched" by a 16 kc./s. pulse output of a pulse amplifier 117 which derives its signal from a coincidence detector 118. This coincidence detector receives the combined signals from amplifiers 81, 82 and 83 during the periods when these signals are transmitted simultaneously from each of the various stations. The combined input to the coincidence detector 118 will have a wave form, such as is shown in Figure 3, consisting of the fifth, sixth, eighth and ninth harmonics of a 16 kc./s. fundamental frequency. The "notching" output signal of the amplifier 117 has to be switched on to the appropriate divider in synchronism with the transmissions so that the divider in each channel is synchronised by the signal derived from the simultaneous radiation of four signals from the associated transmitting station.

The combined signals from all the amplifiers 80–85 are applied to a coincidence detector 120 which feeds a pulse amplifier 121 to produce pulses having a 1 kc./s. repetition rate. The output of the amplifier 121 is switched on to the dividers 98, 102, 105 and 109 in turn at the appropriate time intervals when the six signals are radiated by the associated station. This output serves to "notch" these dividers.

The output of the master oscillator 88 is applied to the inputs of three frequency multipliers 122, 123 and 124 to produce signals in amplifiers 125, 126 and 127 having frequencies of 288, 384 and 480 kc./s. respectively. A second signal of frequency 288 kc./s. is produced by multiplying the output of oscillator 93 in a frequency multiplier 128 and is amplified in an amplifier 129. A phase indicator 130 is provided to indicate the phase relationship of the 288 kc./s. outputs from amplifiers 125. Similarly a 384 kc./s. signal is produced by multiplying the output of oscillator 91 in a frequency multiplier 131 and this signal is amplified in an amplifier 132 before being applied to one input of the phase difference indicator 133 which compares the phase of this signal with the output of amplifier 126. A second output of 480 kc./s. is obtained by multiplying the output of oscillator 89 in a frequency multiplier 134 and amplifying it in an amplifier 135. A phase difference indicator 136 indicates the phase relationship of the outputs of amplifiers 127 and 135. It will be seen that the indicators 130, 133 and 136 each serve to provide position line information from the normal transmissions from the master and the three slave stations. These indications are not affected by any short interruptions of the radiated signals since the indications are obtained from the oscillators phase locked to the received signals during the normal transmissions. The indicators 130, 133 and 136 provide fine pattern indications which may be ambiguous but the remaining indicators 111–116 provide intermediate and coarse pattern indications to eliminate or reduce the ambiguities in the fine pattern indications.

In the systems described with reference to Figures 8 and 9, a number of signals are radiated simultaneously from each station. It will be appreciated that if these signals are combined in a multi-tuned antenna and if the phase relationship of these signals is similar to the phase relationship of the harmonics derived from a pip generator, then the wave form would be peaked as shown in Figures 2 and 3. It is particularly convenient to use a pip generator for referencing the receivers and the receivers, therefore, are referenced on the basis of the signals being radiated in the phase relationship such as would give this peaked wave form. However, in order to avoid the excessive voltages on the antenna consequent upon the use of such a peaked wave form, an arbitrary phase change may be made in one or more of the radiated signals and equal changes introduced in the receiver. For example, in an arrangement employing fifth, sixth, eighth and ninth harmonics, the fifth harmonic may be reversed in phase at the transmitter and a similar phase reversal is effected in the receiver after the receiver has been referenced by means of the reference signal generator. A phase reversal can readily be effected accurately simply by reversing a pair of connections to a transformer and hence need not affect the accuracy of referencing.

We claim:

1. A hyperbolic radio navigation system in which a position line is determined by indicating the difference in the time of propagation to a receiver of signals emitted from two stations in known spaced geographical positions, wherein three signals are emitted from a first station satisfying the respective phase conditions, given in radians of angle, $n_1\omega_0 t + a_1$, $n_2\omega_0 t + a_2$ and $(n_1+1)\omega_0 t + a_3$, and three signals are emitted from the second station satisfying the respective phase conditions $n_1\omega_0 t + k$, $n_2\omega_0 t + a_2 + k$ and $(n_1+1)\omega_0 t + a_3 + k$, where $n_1$ and $n_2$ are integers, $\omega_0$ is $2\pi$ multiplied by a fundamental frequency in cycles per second, $t$ is time in seconds and $a_1$, $a_2$, $a_3$ and $k$ are constants, the transmissions being switched in sequence such that the signals of each frequency are transmitted from one station during intervals of the tranmissions of the same frequency from the other station, and the transmission being distinctively altered periodically for synchronising switching means at the receiver with the switching of the transmissions and wherein the receiver comprises means for receiving the radiated signals, switching means which are synchronised by the distinctive alteration in transmission and which are arranged to separate the received signals from the two transmitters, and a phase difference indicator for indicating the difference in time of propagation which indicator has a recurrence cycle of time difference indication equal, in seconds, to the reciprocal of the fundamental frequency, said indicator being operated by a fine control and a coarse control, said fine control being dependent on a pair of signals derived from locally generated non-interrupted signals, one of which is phase-controlled by only one of the signals received from said first station and the other by only one of the signals received from said second station and the coarse control being dependent on six received signals derived from the three different frequencies transmitted from each of the stations.

2. A hyperbolic radio navigation system as claimed in claim 1 wherein the two locally generated non-interrupted signals are produced in the receiver by a pair of oscillators arranged to oscillate at the same frequency, which frequency is one of the radiated frequencies, the two oscillators being controlled in phase respectively by the signals received from the two stations.

3. A hyperbolic radio navigation system as claimed in claim 1 wherein at least one of the two locally generated non-interrupted signals is produced in the receiver by an oscillator arranged to oscillate at said fundamental frequency.

4. A hyperbolic radio navigation system as claimed in claim 1 wherein, at each station, the various different frequencies are radiated in sequence.

5. A hyperbolic radio navigation system as claimed in claim 1 wherein, at each station, the various different frequencies are radiated simultaneously.

6. A hyperbolic radio navigation system as claimed in claim 5 wherein the intermittent radiation of the plurality of different frequencies at each of the two stations occurs during intervals in a normal transmission in which signals of different frequencies are radiated simultaneously from the two stations.

7. A hyperbolic radio navigation system as claimed in claim 6 wherein, during the normal transmission, a single signal is radiated from each station, the frequencies of each of the signals being one of the frequencies $n_1$, $n_2$ or $n_1+1$ multiplied by the fundamental frequency.

8. A hyperbolic radio navigation system as claimed in claim 2 wherein, at the receiver, the simultaneously received signals of different frequency from the first station are combined to produce a signal of the fundamental frequency, which signal of the fundamental frequency is used to phase-lock a frequency divider coupled to divide, to the fundamental frequency, that one of the locally generated non-interrupted signals which is phase-controlled by the first station thereby providing a first output of said fundamental frequency and wherein the simultaneously received signals of different frequency from the second station are combined to produce a signal of the fundamental frequency, which signal of the fundamental frequency is used to phase-lock a second frequency divider coupled to divide, to the fundamental frequency, the second of the locally generated non-interrupted signals which are phase-controlled by the second station thereby providing a second output of said fundamental frequency and wherein said coarse control is effected by phase comparison of the two output signals of the fundamental frequency.

9. A hyperbolic radio navigation system as claimed in claim 2 wherein, at the receiver there are provided a pair of dividers associated respectively wih the two oscillators, each divider being arranged to divide the oscillator output frequency to a frequency equal to the difference between $n_1$ and $n_2$ multiplied by the fundamental frequency and wherein each of the dividers is phase-locked by a beat signal obtained by combining two signals one of which is the output of the associated oscillator and the other of which is that one of the three signals received from the transmitter controlling the associated oscillator which differs in frequencies from the oscillator frequency by an amount equal to the frequencies of the divider output.

10. A hyperbolic radio navigation system as claimed in claim 9 wherein the oscillators at the receivers are controlled by the received signals of frequency $n_1$ or $n_1+1$ multiplied by the fundamental frequency and wherein there are provided a further pair of frequency dividers arranged respectively to divide the outputs of the first pair of dividers to the fundamental frequency and wherein each of the second pair of dividers is phase-locked by a beat signal obtained by combining two signals one of which is the output of the associated oscillator and the other of which is that one of the three signals received from the transmitter controlling the associated oscillator which differs in frequency from the oscillator frequency by an amount equal to the fundamental frequency, the two outputs from the further pair of dividers being used to effect the coarse control of the phase difference indicator.

11. A hyperbolic radio navigation system as claimed in claim 1 wherein there is provided a third transmitting station radiating signals satisfying the respective phase conditions given in radians of angle, $n_1\omega_0 t + a_1 + k_1$, $n_2\omega_0 t + a_2 + k_1$ and $(n_1+1)\omega_0 t + a_3 + k_1$ where $k_1$ is a constant, the transmissions being switched in sequence such that the signals of each frequency are transmitted from one station during intervals of the transmissions of the same frequency from the other stations, and wherein the receiver is provided with two of said phase difference indicators, one indicator being arranged to indicate the difference in time of propagation of signals from the first and the second stations and the other being arranged to indicate the difference in time of propagation of signals from the first and third stations.

12. A hyperbolic radio navigation system in which, at a mobile receiver, a phase comparison is made between signals derived from transmissions from a pair of spaced stations, which system comprises a master station having means for intermittently radiating a plurality of signals of different frequency in fixed multiple phase relation, the frequency difference of two of the radiated signals being a sub-multiple of all the frequencies, a slave station spaced from the master station and having means for intermittently radiating signals of the same frequencies as are radiated by the master station and in fixed phase relation therewith, the signals of each frequency being radiated from the slave station during the intervals between radiation of signals of corresponding frequency from the master station, and a mobile receiver, which receiver comprises means for receiving and separating the signals from the master and slave stations, a pair of sources of locally generated signals, means for synchronising the output of one of the sources in phase and frequency with received master signals of one frequency, means for synchronising the output of the other source in phase and frequency with received slave signals of said one frequency, a first frequency dividing means for dividing the output of the first source to said sub-multiple frequency, means for phase-locking the first dividing means utilising the signals received from the master station, a second frequency dividing means for dividing the output of the second source to said sub-multiple frequency, means for phase-locking the second dividing means utilising the signals received from the slave station and a phase indicator for indicating the phase relationship of the outputs from the two dividing means.

13. A hyperbolic radio navigation system having a pair of spaced transmitting stations and a mobile receiver, one of said stations having means for intermittently radiating three signals of different given frequencies in fixed multiple phase relation, the other of said stations having means for intermittently radiating three signals of said given frequencies in fixed multiple phase relation with the signals radiated by said one station, means at said first station for effecting a distinctive periodic synchronising transmission, switching means at said other station actuated by said synchronising transmission from said one station to control the timing of the transmission from said other station, the timing of said transmissions being such that within each period each station transmits a signal of each frequency and only one station transmits a signal of a given frequency at a given time; and said mobile receiver having means for separately receiving signals of said three frequencies, means for producing a first and second unmodulated signal having a frequency squal to the lowest difference frequency of the received signals, means for phase control of said first and second unmodulated signals such as to produce a phase difference representative of the difference in distance to said two stations comprising a first fine phase control operative over a fraction of a cycle applied to the first unmodulated signal for holding a fine phase relation to one of the received signals from said one station, a second fine phase control operative over a fraction of a cycle applied to the second unmodulated signal for holding a given phase relation to one of the received signals, from said other station, a coarse phase control to remove any fractional ambiguity with a cycle applied to said first unmodulated signal and derived from a phase relation involving all three signals received from said one station, and a coarse phase control applied to the second unmodulated signal and derived from a phase relation involving all three signals received from said other station.

14. A radio navigation system comprising: two spaced transmitting stations and a mobile receiver, means to derive a first, second, third and fourth non-interrupted signal of given frequency, means at one of said stations to transmit three interrupted signals having frequencies which are different multiples of said given frequency and having a fixed multiple phase relation to said first signal, means at the other of said stations to transmit three interrupted signals having frequencies identical to those transmitted from said one station and having a fixed multiple phase relation to said second signal of given frequency, means for effecting a cycle of switched transmissions in which all three frequencies are transmitted from each station and no signal of the same frequency is transmitted from more than one station at the same time, means at said mobile receiver for separately receiving and amplifying the received signals of different frequencies, a fine and a coarse phase control means applied to the third and fourth non-interrupted signals of given frequency, the fine phase control of the third non-interrupted signal being derived from one of the signals received from said one station, and the coarse phase control of said third non-interrupted signal being derived from all three signals received from said one station, the fine phase control of the fourth non-interrupted signal being derived from one of the signals received from said other station, and the coarse phase control of said fourth non-interrupted signal being derived from all three signals received from said other station, and a phase difference indicator giving the phase difference between the third and fourth signals of given frequency and arranged to indicate the difference in distance between the first and second stations.

15. A radio navigation system having spaced transmitting stations each provided with a continuous signal source of given frequency, a mobile receiver provided with two other continuous signal sources of said given frequency, means to transmit three different harmonics of said given frequency from both of said stations, means to provide a fixed multiple phase relation between the signals of given frequency at a given station and its radiated harmonics, means to provide a fixed phase difference between the two signals of given frequency at the two stations, means at said mobile receiver for providing a given complex phase relation between all three signals received from one of said stations and the given frequency of one of said two other sources of given frequency and to provide the same given complex phase relation between all three signals received from the other of said stations and the given frequencies of the other of said two sources of given frequency, thereby providing a phase difference between said other sources of given frequency which is indicative of the difference in distance between said two stations.

16. A radio navigation system comprising: two spaced transmitting stations and a mobile receiver, means at one of said stations including a source of non-interrupted signals of frequency $F_A$ to periodically radiate harmonically related signals of frequencies $n_1F_A$, $n_2F_A$, and $n_3F_A$, where $n_1$, $n_2$, and $n_3$, are different integers and $F_A$ is the fundamental frequency of the harmonic series, means at the other of said stations including a source of non-interrupted signals of frequence $F_B$ to periodically radiate harmonically related signals of frequencies $n_1F_B$, $n_2F_B$, and $n_3F_B$, where $F_B$ is equal to $F_A$, means to maintain a predetermined multiple phase relation between said signal of frequency $F_A$ and each of said signals of frequencies $n_1F_A$, $n_2F_A$, and $n_3F_A$, and between said signal of frequency $F_B$ and each of said signals of frequencies $n_1F_B$, $n_2F_B$, and $n_3F_B$, and between said signals of frequencies $F_A$ and $F_B$, means on said mobile receiver to provide two pairs of non-interrupted signals in which each pair has a predetermined multiple phase relation, the signals of one pair having frequencies of $F_C$ and $n_aF_C$, and the signals of the other pair having frequencies $F_D$ and $n_bF_D$, where $n_a$ and $n_b$ are any one of the integers $n_1$, $n_2$ and $n_3$, and wherein $F_C$ and $F_D$ are equal to $F_A$, said receiver including means for receiving transmitted signals of frequencies $n_1F_A$, $n_2F_A$, $n_3F_A$, $n_1F_B$, $n_2F_B$, and $n_3F_B$, means for maintaining a predetermined phase relation between the receiver signal of frequency $n_1F_A$ and the non-interrupted signal of frequency $n_1F_C$, and between the received signal of $n_1F_B$ and the non-interrupted signal of $n_1F_D$, and between each of the three received signals of frequencies $n_1F_A$, $n_2F_A$, and $n_3F_A$ and the non-interrupted signal of frequency $F_C$, and between each of the three received signals of frequencies $n_1F_B$, $n_2F_B$, and $n_3F_B$, and the non-interrupted signal of frequency $F_D$, the phase control of said non-interrupted signals of frequencies $F_C$ and $F_D$ acting as a coarse control and the phase control of said non-interrupted signals of frequencies $n_1F_C$ and $n_1F_D$ acting as a fine control, and a phase difference indicator for measuring the phase difference between the non-interrupted signals of frequencies $F_C$ and $F_D$ to produce a reading indicative of the difference in distance from the receiver to the two stations.

17. In a hyperbolic radio navigational aid in which all signals are harmonically related, a first transmitter for radiating at least three signals of different given frequencies, a second transmitter for radiating at least three signals of said different given frequencies, means for generating a first non-interrupted sub-multiple frequency signal having a phase control by said three, at least, signals separately received from said first transmitter, means for generating a second non-interrupted sub-multiple frequency signal having the same frequency as that of said first sub-multiple frequency signal, and having a phase control operated by said three, at least, signals separately received from said second transmitter, means providing alternate synchronized transmissions from said first and second transmitters so as to avoid dual transmission of a single frequency, and a means to indicate the phase difference between the first and second non-interrupted signals.

18. A radio navigation system comprising: two spaced transmitting stations and a mobile receiver, means to derive a first, second, third and fourth non-interrupted signal of given frequency, means at one of said stations to transmit three interrupted signals having frequencies which are different multiples of said given frequency and having a fixed multiple phase relation to said first signal, means at the other of said stations to transmit three interrupted signals having frequencies identical to those transmitted from said one station and having a fixed multiple phase relation to said second signal of given frequency, means for effecting a cycle of switched transmissions in which all three frequencies are transmitted from each station and no signal of the same frequency is transmitted from more than one station at the same time, means at said mobile receiver for separately receiving and amplifying the received signals of different frequencies, means for deriving a first sub-multiple frequency signal from said separately amplified signals received from said one station, means for deriving a second sub-multiple frequency signal from said separately amplified signals received from said other station, and means including a phase controlled oscillator for deriving a phase difference indication from said first and second sub-multiple frequency signals.

References Cited in the file of this patent

UNITED STATES PATENTS

| | | |
|---|---|---|
| 2,440,755 | O'Brien | May 4, 1948 |
| 2,502,662 | Mitchell et al. | Apr. 4, 1950 |